T. J. MELL.
TIRE FOR VEHICLE WHEELS.
APPLICATION FILED DEC. 23, 1910.
1,021,422.   Patented Mar. 26, 1912.
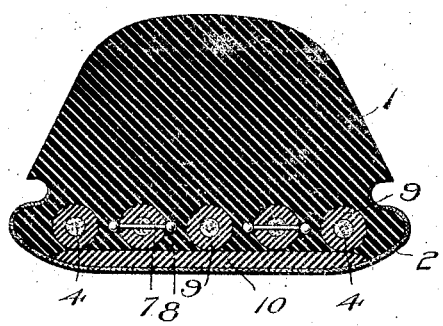
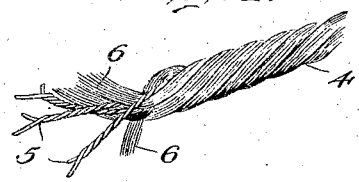
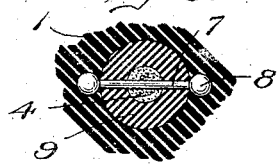
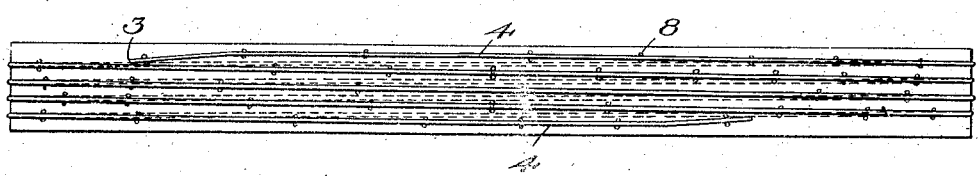
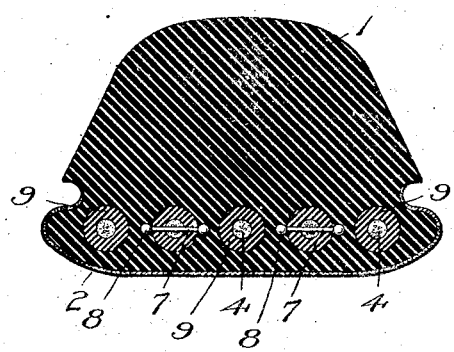
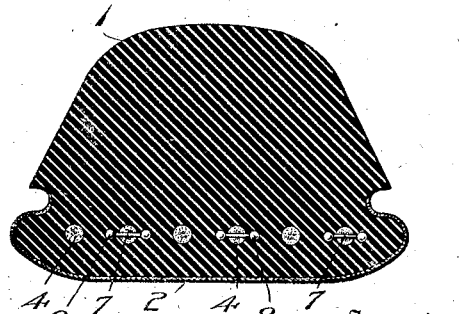
Witnesses
Edwin L. Bradford
M. D. Ballauf
Inventor
Tod J. Mell
Wm C. Dype
Attorney

UNITED STATES PATENT OFFICE.

TOD J. MELL, OF YOUNGSTOWN, OHIO, ASSIGNOR TO THE REPUBLIC RUBBER COMPANY, OF YOUNGSTOWN, OHIO, A CORPORATION OF OHIO.

TIRE FOR VEHICLE-WHEELS.

1,021,422.  Specification of Letters Patent.  Patented Mar. 26, 1912.

Application filed December 23, 1910. Serial No. 598,979.

*To all whom it may concern:*

Be it known that I, TOD J. MELL, a citizen of the United States, residing at Youngstown, in the county of Mahoning and State of Ohio, have invented certain new and useful Improvements in Tires for Vehicle-Wheels; and I do hereby declare the following to be a full, clear, and exact description of the invention, such as will enable others skilled in the art to which it appertains to make and use the same.

My present invention relates to tires for vehicle wheels, particularly to cushion tires designed for use upon trucks and vehicles intended for heavy hauling.

It has for its object the production of solid rubber or elastic tire-bodies reinforced at the base by non-stretchable strands adapted to prevent stretching and creeping of the tire upon its wheel-rim, and to effectually retain it in operative position regardless of whether said rim is of the open or clencher type.

As a further object this invention contemplates novel means for uniting the strands aforesaid with the body of the tire, means for preventing said strands from cutting through the tire when in service, and a novel plan of embedding said reinforcing strands or cable spirally within the tire base.

The invention will be hereinafter particularly described and pointed out in the claims following.

In the accompanying drawings which form part of this application and whereon like letters indicate corresponding parts in the several views: Figure 1 represents a transverse section through the invention and within contained reinforcing strand spirally wound. Fig. 2 is a fragmentary end, partly untwisted, of the wire and textile elements composing the reinforcing and securing strands. Fig. 3 is a fragmentary portion of the tire base relatively enlarged and a transverse section of one reinforcing strand. Fig. 4 is a plan view of the base of a tire body showing its reinforcing strand spirally wound. Figs. 5 and 6 are transverse sectional views of tire modifications.

Reference being had to the drawings and numerals thereon, 1 indicates the body of a solid elastic tire preferably of rubber, which, in the present illustrations, is represented as of a configuration suitable for use with wheel rims of the clencher type, and provided with the flexible canvas or fabric inner lining 2. Within the base of tire body 1 beginning at a given point as at 3, Fig. 4, and passing circumferentially through the tire in spiral arrangement is a non-stretchable reinforcing member 4 preferably composed of interwoven strands of wire 5 and textile threads 6, as shown by Fig. 2 of the drawings. At intervals the member 4 is bisected by anchor-bars 7 provided with terminal balls 8 and projecting upon opposite sides of said reinforcing member as shown. While the said continuous member 4 is itself embedded as a core in a jacket 9 of a rubber compound adapted during vulcanization of the tire to assume a relatively hard finish as compared with the elastic and flexible body 1 of the tire structure.

In the preferred form of construction an annular flat base 10 of rubber compound also adapted to assume a relatively stiff form when cured, is employed at the base of the structure immediately below the similarly hardened jacket or covering 9 of the member 4 aforesaid; but it will be noted that the latter flat base is not essential to the production of a practical tire embodying the leading features of my present invention as exemplified by modified Fig. 5 wherein the relatively hard annulus or base plate 10 is omitted; or by Fig. 6 wherein said plate, and also covering 9 for the member 4 are omitted.

In the course of construction the reinforcing member 4 bisected by anchor-bars 7 is incased in its covering 9 and the whole wound spirally upon the annular flat base 10, as indicated by Fig. 1 of the drawings. The balance of the tire body 1 is then built up, and the entire structure vulcanized as usual in the manufacture of tires, but it will be noted that the composition of both jacket 9 and annulus 10 is such that these members assume a relatively hard and stiff form when cured. As a consequence the reinforcing member 4 is less likely to cut through the base of the tire body when subjected to hard usage, or when the tire is applied to its wheel rim initially. Moreover, it may be noted that when so constructed and arranged the rubber compound adjacent to the non-stretchable member 4 during vulcanization actually enters and unites securely with the textile strands of said member most effectually, and, owing to this fact, as also the anchorage afforded by bars 7, slipping or creeping of the tire body upon said reinforcing strand is practically impossible, particularly since the jacket or covering 9 and body of the tire are united by vulcanization into a homogeneous body.

This being a description of my invention, its use and operation as a completed tire, are quite obvious, and need not be herein dwelt upon. It may, however, be added that the spiral arrangement of reinforcing member 4 and its covering or jacket 9 as clearly represented by Fig. 1, serves to most effectually interlock the tire body 1 upon its wheel rim when pressure is applied to the structure transversely by the addition of the wheel flanges as usual in mounting tires. This operation naturally compresses the tire-base, formed in dovetailed relation with the strands and relatively hard casing or jacket 9 aforesaid, from side to side of the structure rendering it physically impossible to withdraw the tire 1, or any portion thereof, from its dovetailed confines between the adjacent coils of the reinforcing member 4 and outer covering or jacket 9.

Having thus described my invention, what I claim and desire to secure by Letters Patent, is:

1. An elastic tire for vehicle wheels comprising in combination an embedded non-stretchable reinforcing member encircling the structure, and anchor bars bisecting said reinforcing member at intervals.

2. An elastic tire for vehicle wheels comprising in combination an embedded non-stretchable reinforcing member encircling the structure continuously, a jacket of relatively hard material inclosing said reinforcing member, and anchor bars bisecting said reinforcing member and its inclosing jacket at intervals.

3. An elastic tire for vehicle wheels comprising in combination a non-stretchable reinforcing member spirally arranged, a jacket of relatively hard rubber inclosing said reinforcing member, anchor bars bisecting said reinforcing member and its inclosing jacket at intervals, and an annulus of relatively hard rubber beneath the convolutes of said reinforcing member.

In testimony whereof I affix my signature, in presence of two subscribing witnesses.

TOD J. MELL.

Witnesses:
THOMAS L. ROBINSON,
C. I. GARRISON.